US012416588B2

(12) United States Patent
Hanson et al.

(10) Patent No.: US 12,416,588 B2
(45) Date of Patent: Sep. 16, 2025

(54) SEPARATION COLUMN INSPECTION USING OFF AXIS GAMMA SCANNING (71) Applicant: Ecolab USA Inc., Saint Paul, MN (US)

(72) Inventors: Daryl Hanson, San Antonio, TX (US); Charles Winfield, Muldoon, TX (US)

(73) Assignee: Ecolab USA Inc., Saint Paul, MN (US)

( * ) Notice: Subject to any disclaimer, the term of this patent is extended or adjusted under 35 U.S.C. 154(b) by 539 days.

(21) Appl. No.: 17/701,431

(22) Filed: Mar. 22, 2022

(65) Prior Publication Data

US 2022/0299453 A1    Sep. 22, 2022

Related U.S. Application Data (60) Provisional application No. 63/176,550, filed on Apr. 19, 2021, provisional application No. 63/164,034, filed on Mar. 22, 2021.

(51) Int. Cl.
*G01N 23/095* (2018.01)
*G01N 23/10* (2018.01)
(Continued)

(52) U.S. Cl.
CPC ........... *G01N 23/095* (2018.02); *G01N 23/10* (2013.01); *G01N 23/12* (2013.01); *G01N 23/18* (2013.01);
(Continued)

(58) Field of Classification Search
CPC ...... G01N 23/095; G01N 23/10; G01N 23/12; G01N 23/18; G01N 2223/043; G01N 2223/3303; G01N 2223/646
See application file for complete search history.

(56) References Cited

U.S. PATENT DOCUMENTS

| 4,283,629 A | 8/1981 | Habermehl et al. |
| 5,670,026 A | 9/1997 | Rutan |

(Continued)

FOREIGN PATENT DOCUMENTS

| CN | 1174243 C | 11/2004 |
| CN | 201903512 U | 7/2011 |

(Continued)

OTHER PUBLICATIONS

Machine Translation for CN 201903512 U, printed 2024 (Year: 2024).*

(Continued)

*Primary Examiner* — John C Kuan
(74) *Attorney, Agent, or Firm* — Fredrikson & Byron, P.A.

(57) ABSTRACT

A method of inspecting a separation vessel may utilize off axis gamma scanning. During scanning, a gamma radiation source can emit gamma radiation through a separation vessel toward a detector, and the detector can detect radiation emitted by the gamma radiation source and passing through the separation vessel. The gamma radiation source may be positioned at a first vertical elevation along the separation vessel and the detector positioned at a second vertical elevation along the separation vessel different than the first vertical elevation. As a result, a radiation path may be defined between the gamma radiation source and the detector that transects the separation vessel at a non-zero degree angle with respect to a horizontal plane.

13 Claims, 6 Drawing Sheets (51) Int. Cl.
*G01N 23/12* (2018.01)
*G01N 23/18* (2018.01)
(52) U.S. Cl.
CPC ............ *G01N 2223/043* (2013.01); *G01N 2223/3303* (2013.01); *G01N 2223/646* (2013.01)

(56) References Cited

U.S. PATENT DOCUMENTS

| | | | |
|---|---|---|---|
| 7,010,087 B2 | 3/2006 | Robins | |
| 7,800,061 B2 | 9/2010 | James et al. | |
| 8,129,692 B2 | 3/2012 | Winfield et al. | |
| 9,181,499 B2 | 11/2015 | Mason et al. | |
| 9,885,566 B2 | 2/2018 | Ferguson, Jr. et al. | |
| 9,891,093 B2 | 2/2018 | Banks et al. | |
| 10,067,076 B2 | 9/2018 | Ronchi | |
| 2015/0159944 A1* | 6/2015 | Valencia | F25J 3/0209 62/125 |
| 2018/0100816 A1* | 4/2018 | Featonby | G01N 23/18 |
| 2021/0080406 A1* | 3/2021 | Issamu Haraguchi | G01N 23/046 |
| 2021/0325323 A1* | 10/2021 | Grof | G01N 23/2206 |

FOREIGN PATENT DOCUMENTS

| | | |
|---|---|---|
| CN | 102063948 B | 6/2012 |
| CN | 104833682 A | 8/2015 |
| EP | 300242 B1 | 2/1992 |
| EP | 489151 B1 | 5/1997 |
| EP | 904818 A1 | 3/1999 |
| EP | 2696196 A1 | 2/2014 |
| EP | 3087376 A1 | 11/2016 |

OTHER PUBLICATIONS

"Gamma Scanning—Inspection of Trayed and Packed Towers," ScanTech, 2019, 8 pages.
"Tower Scans," Quantum Technical Services, 2019, 4 pages.
Abdullah, "Gamma-ray scanning for troubleshooting, optimisation and predictive maintenance of distillation columns," Hydrocarbon Asia, Jan./Feb. 2005, pp. 62-65.
Bowman, "Monitoring process performance," CEP Magazine, Sep. 2001, pp. 13-14.
El Korchi et al., "Coking phenomenon detection in liquid flow through a solid phase in a lab-scale distillation column using radioisotope techniques," Measurement, vol. 110, Nov. 2017, pp. 339-343, Abstract only.
Elsharkawy et al., "Efficient fault detection and diagnosis of distillation col. using gamma scanning," Journal of Radioanalytical and Nuclear Chemistry, vol. 316, 2018, pp. 741-752, Abstract only.
International Patent Application No. PCT/US2022/021436, International Search Report & Written Opinion mailed Jun. 27, 2022, 14 pages.

* cited by examiner

SEPARATION COLUMN INSPECTION USING OFF AXIS GAMMA SCANNING

RELATED MATTERS

This application claims priority to U.S. Patent Application No. 63/164,034 filed Mar. 22, 2021, and U.S. Patent Application No. 63/176,550, filed Apr. 19, 2021. The entire contents of each of these applications are incorporated herein by reference.

TECHNICAL FIELD

This disclosure relates to non-invasive inspection of process equipment and, more particularly, to gamma scanning of separation columns.

BACKGROUND

Gamma scanning of structures such as distillation columns is a standard industrial diagnostic method for measuring changes in density at different parts of the structure, for example to determine the location and integrity of column trays or other internal structures within the column. Distillation column gamma scans have also proven to be useful in diagnosing process related problems such as maldistribution, entrainment, flooding, foaming, weeping and damage. Any of these issues can result in contaminated product streams and reduced capacity.

Gamma scanning typically involves non-disruptively examining a column by moving a sealed radioactive source emitting gamma radiation in parallel with a radiation detector along the exterior of the column. Interaction of the radiation with the medium of interest will produce changes in the radiation beam absorption intensity that can be correlated to the property of the medium. Information generated by the gamma scan can reveal structural and/or process issues inside of the column impacting the performance of the column.

While gamma scanning can provide important information about the internal structure and/or operation of a distillation column, a gamma scan cannot provide a perfect picture of tower internals mechanical status or structure. For example, to create a scan map of a column, a radioactive source and detector may be moved in discrete intervals up or down the length of the column between each scan data point. If a critical issue is occurring inside of the column at a location between the scan locations, the issue may be missed. This may necessitate a rescan of the column, potentially using smaller scan intervals, requiring many more scans that increase the cost and execution time for the inspection.

SUMMARY

In general, this disclosure is directed to systems and techniques for performing a gamma scanning inspection of a separation vessel in which a radiation source and a detector are positioned in non-parallel alignment to each other. For example, the radiation source can be positioned offset at a higher or lower vertical elevation along the vertical length (or main axis) of the separation vessel compared to the detector. As a result, the radiation path between the radiation source and the detector can cross through the separation vessel at a non-zero degree angle with respect to the horizontal plane (e.g., a plane defined by ground). In other words, the radiation path can transect the separation vessel both horizontally and vertically. When so configured, the gamma scan can reveal information about the internal structure and/or operation of the column not only in a specific horizontal plane but also across a vertical portion of the column through which the radiation path transects. This can help reveal process issues and/or structural integrity concerns inside of the separation vessel that may otherwise be missed in a horizontal scan of the vessel.

The off-axis scanning systems and techniques of the disclosure may be used to inspect any type of process equipment where non-invasive inspection of the equipment is desired. In some implementations, the off-axis scanning systems and techniques of the disclosure may be used to inspect a separation vessel in which a mixture of chemical components are separated into constituent components and/or constituent component groups and/or contaminants are removed from the incoming feed. A separation vessel may be configured as a liquid-vapor separation vessel, such as a distillation column, in which rising vapor interacts with falling liquid to effect separation based on boiling point/vapor pressure differences between different compounds in a feed stream. As another example, a separation vessel may be configured as a liquid-liquid separation tower or separation drum. In either configuration, the separation vessel may include internal trays and/or packing material that functions to increase contact between different components in the vessel and separation efficiency. In practice, these internal components may be mis-installed, become damaged and/or fouled during operation, and/or other structural issues may arise that disrupts the designed process flows and efficiency of the vessel. For these and other reasons, a separation vessel may be scanned using the gamma scanning technology of the present disclosure during active operation to identity internal performance issues inside of the vessel.

In one example, a method of inspecting a separation vessel using gamma scanning is described. The method involves emitting gamma radiation by a gamma radiation source through a separation vessel toward a detector and detecting, by the detector, radiation emitted by the gamma radiation source and passing through the separation vessel. The method specifies that the gamma radiation source is positioned at a first vertical elevation along the separation vessel and the detector is positioned at a second vertical elevation along the separation vessel different than the first vertical elevation, thereby defining a radiation path between the gamma radiation source and the detector transecting the separation vessel at a non-zero degree angle with respect to a horizontal plane.

In another example, a method of scanning a separation vessel is described. The method includes positioning a gamma radiation source and a detector on opposed sides of a separation vessel and positioning the gamma radiation source and the detector at a plurality of different vertical elevation pairs along a length of the separation vessel. The example specifies that, at each of the plurality of different vertical elevation pairs, the gamma radiation source is at a different vertical elevation than the detector such that a radiation path between the gamma radiation source and the detector transects the separation vessel at a non-zero degree angle with reference to a common horizontal plane. The method also involves, at each of the different vertical elevation pairs, emitting gamma radiation by the gamma radiation source through the separation vessel and detecting, by the detector, radiation emitted by the gamma radiation source and passing through the separation vessel.

In another example, a separation vessel gamma radiation scanning system is described. The system includes a separation vessel, a gamma radiation source, and a detector. In the example system, the gamma radiation source and the detector are positioned on opposed sides of the separation vessel with the gamma radiation source positioned at a different vertical elevation than the detector such that a radiation path between the gamma radiation source and the detector transects the separation vessel at a non-zero degree angle with respect to a horizontal plane.

The details of one or more examples are set forth in the accompanying drawings and the description below. Other features, objects, and advantages will be apparent from the description and drawings, and from the claims.

DETAILED DESCRIPTION

This disclosure generally relates to systems and techniques for non-invasively scanning a separation vessel using a radiation source and a corresponding detector that are positioned vertically offset from each other in different horizontal planes. The radiation source and detector can be placed on different (e.g., opposite) sides of the separation vessel. The radiation source can emit radiation, at least a portion of which passes through the separation vessel and is detected by the detector. Accordingly, the detector can measure the amount of radiation transmitted through the separation vessel. The transmitted radiation may then be converted to a density value. In some implementations, the measured density is compared to one or more threshold densities and/or a baseline density taken during earlier operation of the vessel to identify operational issues inside the vessel, e.g., hardware issues, flow rate issues, fouling, foaming, entrainment, and/or flooding.

In practice, a user may initiate a scan of a separation vessel when the separation vessel is not performing according to expected operating standards. For example, if the throughput and/or separation efficiency of the separation vessel is not performing according to design expectations, the user may initiate a scan to better understand the internal operating conditions of the vessel without taking the vessel offline. This can allow the user to diagnose and potentially mitigate the performance issues impacting the separation vessel while still leaving the vessel in service.

While the specific issue affecting the performance of the separation vessel will vary case-to-case, example problems that may be encountered during inspection of a separation vessel include, but are not limited to, missing or damaged hardware (e.g., one or more blown out tray panels), partial or complete plugging of internal flow apertures due to fouling build up and/or internal debris, unexpected internal fluid flows (e.g., foaming, liquid backup, internal flooding), and the like. These issues may not present throughout the separation vessel but are typically localized as specific locations in the vessel.

During a vessel scan, a radiation source and detector pair may be moved up and/or down the length of the separation vessel. At each location where the radiation source and detector pair are stopped, a radiation transmission reading can be made. This can provide multiple radiation transmission measurements at different locations along the vessel which, in turn, indicates the material inside of the vessel at each scan location. If the radiation source and detector pair are horizontally aligned with each other, the scan may only reveal the internal characteristics of the vessel at that specific horizontal plane where the radiation source and detector are positioned for performing the scan. While the radiation source and detector pair can be advanced up or down the vessel to make another scan, the pair may typically be advance a minimum interval distance (e.g., 25 mm, 50 mm, 100 mm or more). As a result, vessel internals between scan intervals may be missed from inspection. Indeed, low profile trays (e.g., 15 mm or less) may have a thickness less than a distance a radiation source and detector pair are moved up or down a vessel during inspection. As a result, when the radiation source and detector pair are horizontally aligned with each other, damage or other performance issues with the tray may be entirely missed.

In accordance with some implementations of the present disclosure, however, a radiation source and detector pair may be positioned vertically offset from each other when performing a scan of a separation vessel. As a result, radiation emitted by the radiation source and detected by the detector can travel at an angle through the vessel, transecting both a horizontal and vertical extent of the vessel over the region of the transmission. The transmitted radiation can be converted to density, providing an indication of the internal hardware condition and/or fluid behavior over both the horizontal and vertical extent of the scan. This can reveal compromising internal issues that may otherwise be missed between discrete scan locations if the radiation source and detector were otherwise horizontally aligned.

Figure 1:
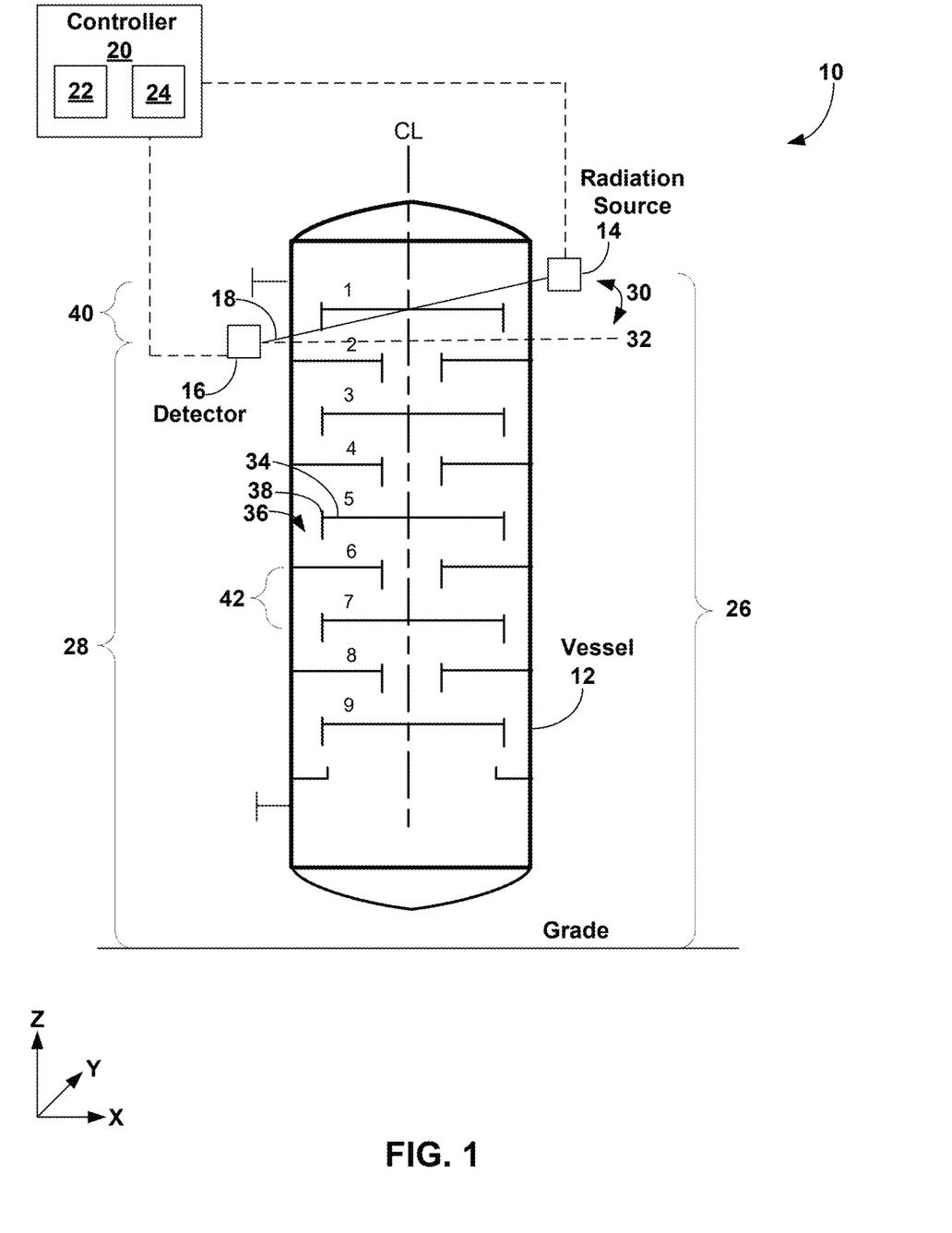
FIG. 1 is a conceptual illustration of an example system for scanning a separation vessel.

FIG. 1 is a conceptual illustration of an example system 10 for scanning a separation vessel 12. System 10 includes a radiation source 14 (also referred to as "source 14" herein) and a detector 16. Radiation source 14 and detector 16 are positioned externally to, and on different sides of, separation vessel 12. A radiation path 18 is defined between source 14 and detector 16. As will be described in greater detail below, radiation path 18 may be off axis with respect to a horizontal plane. In operation, source 14 can emit radiation into separation vessel 12. A portion of the emitted radiation may be absorbed by the material structure defining separation vessel 12 (e.g., sidewall material, internal hardware) and/or fluid inside of the vessel. However, a transmitted portion of the radiation may be detected by detector 16, providing information indicating the internal structure and/or fluid behavior inside of the vessel.

In the example of FIG. 1, system 10 is illustrated as also including a controller 20 communicatively coupled to source 14 and detector 16. Controller 20 can include a processor 22 and memory 24. Controller 20 can communicate with controllable components in system 10 via a wired and/or wireless connection. Memory 24 stores software for running controller 20 and may also store data generated by or received from processor 22, e.g., from detector 16. Processor 22 runs software stored in memory 24 to manage the operation of the scanning system.

To perform a non-invasive inspection of separation vessel 12 using system 10, source 14 and detector 16 can be positioned on different sides of the separation vessel with at least a portion of the vessel interposed between the source and detector. As illustrated in FIG. 1, source 14 can be positioned at a first vertical elevation 26 along the length of separation vessel 10, and detector 16 can be positioned as a second vertical elevation 28 along the length of the separation vessel. The first vertical elevation 26 can be different than the second vertical elevation 28 to provide a vertical offset between the source and detector. As a result, a radiation path 18 defined between source 14 and detector 16 may transect the separation vessel at an angle, e.g., passing through both a horizontal and vertical extent of the vessel between the source and detector.

In the example of FIG. 1, source 14 is illustrated as being at a higher elevation than detector 16. In alternative implementations, detector 16 can be positioned at a higher elevation than source 14. In either case, an angled radiation path may be defined between the source and detector during inspection. The elevation difference between source 14 and detector 16, and correspondingly the angle defined between the source and detector, may vary depending on the characteristics of separation vessel 12 and the objectives of the scan. For example, the elevation difference between source 14 and detector 16 may be selected based on the size of separation vessel 12 and/or the sizing and arrangement of hardware components inside of separation vessel 12, e.g., in order to generate a scan providing sufficient granularity across one or more features of interest in the vessel.

In general, source 14 may be positioned at a different vertical elevation relative to detector 16 so as to define radiation path 18 transecting separation vessel 12 at a non-zero degree angle 30 with respect to a horizontal plane 32. In typical applications, non-zero degree angle 30 may have a value falling within a range from 2 degrees to 75 degrees, such as from 15 degrees to 75 degrees, from 20 degrees to 60 degrees, or from 25 degrees to 55 degrees. Horizontal plane 32 may be any horizontal plane extending perpendicularly with respect to a vertical direction defined by gravity. For example, horizontal plane 32 may be defined by the ground on which separation vessel 12 is supported or otherwise positioned.

The angle 30 of offset between source 14 and detector 16 can vary depending both on the vertical separation distance between the source and detector as well as the horizontal distance separating the source and detector (e.g., the diameter of separation vessel 12). Accordingly, the vertical offset between source 14 and detector 16 may additionally or alternatively be characterized by the vertical elevation or offset 40 between source 14 and detector 16. In certain implementations, the vertical offset 40 between source 14 and detector 16 is at least 10 mm, such as at least 20 mm, at least 30 mm, at least 40 mm, at least 50 mm, at least 60 mm, at least 70 mm, at least 100 mm, at least 200 mm, or at least 300 mm. Additionally or alternatively, the maximum vertical offset 40 between source 14 and detector 16 may be less than a certain value, such as less than three times the minimum separation distance between adjacent trays in separation vessel 12, such as less than two times the minimum separation distance between adjacent trays in the separation vessel, or less than one times the minimum separation distance between adjacent trays in separation vessel. For example, depending on the separation distance between adjacent trays in separation column 12, vertical offset 40 between source 14 and detector 16 may be less than 2000 mm, such as less than 1500 mm, less than 1200 mm, less than 1000 mm, less than 800 mm, less than 600 mm, less than 500 mm, less than 400 mm, less than 300 mm, less than 200 mm, or less than 100 mm.

In practice, source 14 may be controlled via a collimator to emit a comparatively narrow beam of radiation or a comparatively wider beam of radiation, at least a portion of which transmits through the separation vessel is detected by detector 16. Accordingly, while multiple radiation paths may exist between source 14 and detector 16, radiation path 18 defined between the source and detector may be measured between a geometric center of an emission location of the source (e.g., a collimator) and a geometric center of a receiving interface of detector 16. Similar, when determining the vertical elevation of source 14 and detector 16, first vertical elevation 26 may be measured from ground to the geometric center of an emission location of the source (e.g., a collimator), and second vertical elevation 28 may be measured from ground to the geometric center of a receiving interface of detector 16.

Performing an angled scan of separation vessel 12 as illustrated in FIG. 1 can be useful to provide information concerning the internal structure and/or operation of the vessel, potentially revealing information that may be missed in a horizontal scan. In practice, a user may perform a scan of separation vessel 12 to detect performance issues inside of the vessel, such as mechanical defects inside of the separation vessel and/or fouling conditions inside of the vessel. When inspecting hardware inside of separation vessel 12 for potential defects, source 14 and detector 16 may desirably be arranged relative to one or more target hardware components in the vessel so that radiation passes through the one or more target hardware components during the scan. Performing an angled scan can provide inspection information concerning both a horizontal and vertical slice of the separation vessel (with the vertical extent of the slice defined by the vertical separation distance between source 14 and detector 16 and the horizontal extent of the slice defined by the horizontal separation distance between source 14 and detector 16).

Separation vessel 12 can have a variety of different design configurations and internal hardware arrangements. In some implementations, separation vessel 12 is configured as a liquid-liquid treating vessel. In other implementations, separation vessel 12 may be configured as an absorption column (e.g., in which a gas mixture travels up through a vessel while a liquid transfers down and a solute in the gas phase is transferred to the liquid phase). In still other implementations, separation vessel 12 may be configured as a distillation column (e.g., in which vapor rises and liquid falls inside of the vessel resulting in mass and heat transfer between the two phases). Depending on the configuration, separation vessel 12 may be a column having a major length oriented vertically with respect to gravity (e.g., such that the vessel is taller in the Z-direction than the X- and/or Y-directions) or may be a drum having a major length oriented horizontally with respect to gravity (e.g., such that the vessel is longer in the X- and/or Y-directions than in the Z-direction). Separation vessel 12 may include a variety of internal hardware features to facilitate separation such as one or more trays (e.g., sieve trays, valve trays), packing (e.g., random packing, structured packing), and/or fluid control features.

In the example of FIG. 1, separation vessel 12 is illustrated as a vertical column having a plurality of trays 34. Trays 34 are vertically spaced from one another inside of a column housing. While separation vessel 12 is illustrated as having nine trays, a separation vessel may have fewer trays (including no trays) or more trays without departing from the scope of the disclosure. Column 10 can have one or more feed inlets that receives a feed (e.g., gas, liquid, mixed phase) to be separated inside of the column and one or more outlets. Depending on the configuration of separation vessel 12, trays 34 may include a variety of tray flow control features to control liquid height on and flow across the tray and/or vapor pressure and flow through the apertures of the tray. For example, each tray 34 may include a downcomer 36 that directs liquid having flowed across the tray down to a lower tray or discharge location. A weir 38 may extend above the top surface the tray to set the design liquid height on the tray during operation. A variety of different downcomer and weir configurations can be used.

In general, for distillation and absorption towers, downcomer 36 provides a passageway for liquid to pass downwardly from one tray to an underlying tray. In single pass tray arrangements, the downcomers are provided at opposite ends of vertically adjacent trays so the liquid flows completely across one tray from the inlet end to the outlet end before it enters the downcomer for passage to the next lower tray. The liquid then flows in the opposite direction across the lower tray (or in some instances trays that generate a circular flow are utilized such that liquid flows in the same direction on each tray) and enters the associated downcomer for passage to and across lower trays in the same back and forth fashion. In two-pass tray arrangements, the tray is split into two streams which travel in opposite directions on each tray. A center downcomer is provided on every other tray and two end downcomers are placed at opposite ends of intermediate trays to provide the double pass flow pattern. In addition to double pass tray arrangements, alternative multi-pass tray downcomer designs include three and four pass trays. A four-pass tray has side and center downcomers on every other tray and has two intermediate or off-center downcomers on the other-alternating trays. The center and intermediate (or off-center) downcomers have liquid flowing from either side. These tray arrangements include chordal downcomer designs as they cut a chord across the tower. Another type of downcomer that can be used is a central downcomer positioned in the middle of the tray deck that can potentially receive liquid from the entire perimeter of the downcomer. These interior hanging downcomers come in various shapes and sizes as in rectangular or circular cross-sectioned downcomers.

Weir 38 can be positioned at the outlet end of the active area of the tray to provide a mechanical seal on the upstream downcomer and also to cause liquid to accumulate on the top surface of the tray for enhanced interaction with the vapor bubbling upwardly through the apertures in the tray deck before entering downcomer 36. The horizontal area of the tray deck which contains the apertures in vapor-liquid contact (or, in other implementations, liquid-liquid contact) in generally referred to as the active area of the tray because the interactions occurs above the tray in this area. The area of the tray below the downcomer outlet is referred to as the downcomer receiving area and receives the vertically flowing discharge from the downcomer and redirects it horizontally to flow across the tray.

Each tray 34 in separation vessel 12 may be implemented as a tray assembly. A tray assembly may include a planar component that is mounted horizontally within the vessel. The tray assembly can include: a sieve tray part, an inlet downcomer part, and an outlet downcomer part. For the liquid-liquid-type trays, the tray assembly may be mounded on top of a tray support ring affixed to the internal wall surface of the vessel. The outlet and inlet downcomer parts can be represented by a volume through which the sieve tray deck part does not pass. The sieve tray deck part can be horizontally oriented and is typically composed of multiple separate pieces that are welded together and supported, at least in part, by support elements attached to the outlet and inlet downcomer parts and by the tray support ring.

During operation of system 10, source 14 and detector 16 can be positioned at a variety of different locations along the length of vessel 12. Further, as will be discussed, source 14 and detector 16 can be moved along the length of the vessel to provide multiple scans. In some implementations, however, source 14 and detector 16 may be positioned relative to each other such that radiation path 18 defined between the source and detector transects the active area of a tray 34, as illustrated in FIG. 1. This can be useful to provide information concerning the state and/or integrity of the tray, such as if the tray is missing one or more panels that may be impacting the performance of the tray, and/or whether there is fouling on the active area of the tray. Additionally or alternatively, source 14 and detector 16 can be positioned relative to each other such that radiation path 18 transects the downcomer 36 of a tray. This may be useful to detect if a downcomer is partially or fully blocked, e.g., with the debris.

The thickness (e.g., in the Z-direction indicated on FIG. 1) of an individual tray may vary depending on the design and configuration of the tray. In some examples, a tray 34 may have a thickness less than 100 mm, such as less than 50 mm, less than 25 mm, or less than 15 mm. The vertical elevation 40 of the separation vessel 12 transected by radiation path 18 between source 14 and detector 16 may be greater than the thickness of at least one (and optionally each) of the trays 34 in separation vessel 12. This vertical elevation 40 may represent the vertical length of separation vessel 12 crossed by the radiation between source 14 and detector 16 and may be the difference between first elevation 26 at which the source is positioned and second elevation 28 at which the detector is positioned.

Accordingly, the thickness of at least one (and optionally each) of the trays 34 in separation vessel 12 may be less than the vertical elevation 40 of the separation vessel crossed by radiation path 18. For example, the vertical elevation 40 of separation vessel 12 transected by radiation path 18 between source 14 and detector 16 may be at least 15 mm, such as at least 25 mm, at least 50 mm, or at least 100 mm. In some applications, a difference between the elevation at which source 14 is positioned and the elevation at which detector 16 is positioned may range from 10 mm to 250 mm, such as from 15 mm to 150 mm, or from 25 millimeters to 100 mm. Configuring the vertical offset between source 14 and detector 16 (and thereby defining the size of the vertical slice of the vessel scanned) relative to the thickness of one or more trays 34 can be useful to help ensure that a tray is captured during the scan.

When separation vessel 12 is configured with multiple trays 34, spacing 42 may be defined between adjacent trays (an inter-tray distance). Spacing 42 may be the same between each set of adjacent trays or may vary such that the distance between at least one set of adjacent trays is different than a distance between at least one other set of adjacent trays inside of the vessel. In either case, the vertical extent of separation vessel 12 inspected during a particular scan (e.g., as indicated by vertical elevation 40) may be set to a distance less than spacing 42 (e.g., a minimum spacing when different tray spacings are used throughout the tower). For example, the vertical elevation distance 40 between first elevation 26 and second elevation 28 may be set to be less than the spacing 42 between adjacent trays 34. This can help prevent a single scan from transecting the active area of multiple trays, which may provide interfering data that does not allow resolution between the condition and/or operation of the different trays simultaneously scanned. In other examples, the vertical elevation distance 40 between first elevation 26 and second elevation 28 may be set to be less than twice spacing 42 between adjacent trays 34.

Radiation source 14 may comprise ionizing radiation such as X-rays or gamma rays. For example, radiation source 14 may be a gamma-ray emitting source, such as Cesium-137, Cobalt-60 or Sodium-24. The activity (and, hence, type) of radioisotope chosen as source 14 may be selected based on the dimensions of separation vessel 10. Source 14 may be selected to be strong enough to be able to penetrate though the separation vessel to an opposed side where detector 16 is positioned. In some implementations, the activity of source 14 may range from 1 millicuries (mCi) to 1000 mCi and/or may emit radiation at energies from about 100 to above 1500 keV.

Detector 16 can be selected to detect radiation within the radiation energies emitted by source 14 and be sufficiently sensitive to detect radiation variations according to the property of the structure/material to be measured. In various examples, detector 16 may be a scintillation detector (e.g., sodium iodide crystal) and/or a solid-state detector. Detector 16 may include (or be coupled to) a radiation counting device (e.g., photomultiplier coupled to the scintillator). Detector 40 can measure the intensity of the radiation transmitted through separation vessel 10, e.g., providing a measurement of the radiation intensity as counts of radiation per specified time period (e.g. 5,000 counts/6 seconds).

One or more threshold settings may be programmed for the radiation counter, e.g., so the radiation counter only counts detected gamma radiation above and/or below one or more thresholds. For example, system 10 may perform gamma ray energy isolation (e.g., filtering) where a photopeak(s) associated with the isotope used for source 14 are isolated from other scattered or background radiation. In some such implementations, a scintillation detector is coupled to a radiation counter that has a threshold setting that is set relative to the photopeak of the source (e.g., at least 50 keV below the photopeak, such as 100 keV). This can electronically reduce scattered radiation, providing a sharper plot to visualize the results of the scan.

Figure 2:
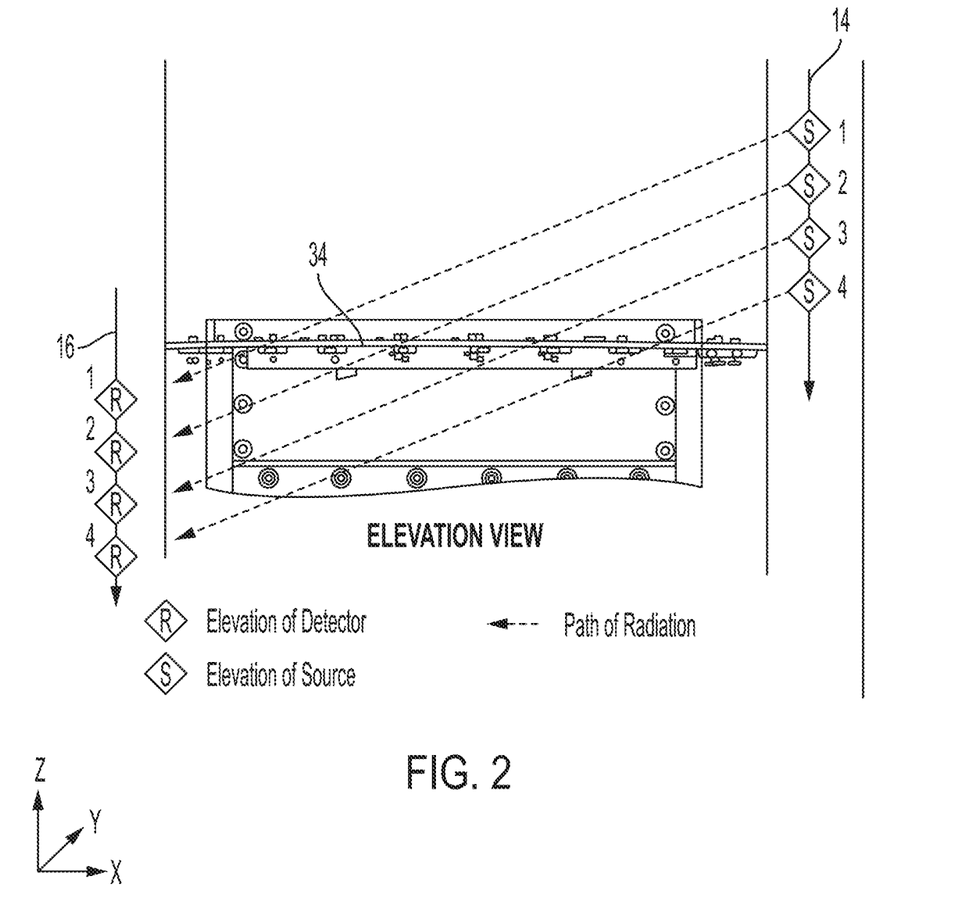
FIG. 2 is a side view of a section of the separation vessel from FIG. 1 illustrating an example radiation source array and detector array.

In practice, source 14 and detector 16 can be implemented as a single source and a single detector, or an array of sources and/or detectors may be used to provide a broader field of inspection. FIG. 2 is a side view of a section of separation vessel 12 from FIG. 1 illustrating an example radiation source array and detector array. In this example, source 14 is implemented using a plurality of gamma radiation sources, at least some of which are vertically arrayed with respect to each other. In addition, detector 16 is implemented using a plurality of detectors, at least some of which are vertically arrayed with respect to each other. When so configured, each source and detector may be defined by pairs for emitting and receiving radiation to and from each other. In the illustrated arrangement, each of the plurality of sources and detectors are arranged co-axial in two dimensions (e.g., in the X-Y plane indicated on FIG. 2) and varies only in the vertical dimension (e.g., in the Z-direction indicated on FIG. 2). In other examples, one or more of the sources and/or detectors may be arranged to be offset from one or more of the other sources and/or detectors in a different dimension in addition to or in lieu of the vertical dimension).

For example, in one specific implementation, system 10 is implemented using a single source 14 and multiple detectors 16 (e.g., two detectors). For instance, system 10 may include a first detector 16 positioned vertically offset from source 14 (e.g., at a vertical offset location as discussed herein) and a second detector positioned at substantially the same vertical elevation as source 14. When so configured, the first detector can generate scan information corresponding to both a horizontal and vertical slice of the separation vessel through radiation path 18 transects. The second detector can generate scan information corresponding a horizontal slice of the separation vessel, e.g., consistent with traditional scanning techniques.

Other combinations of offset and/or horizontal detectors can be used in system 10. For example, system 10 may be implemented using one or more sources 14 (e.g., a single source) and multiple detectors 16 (e.g., two, three, or more detectors). The multiple detectors 16 may each be arranged offset relative to the source 14 (e.g., with each of the detectors being offset according to the example positioning described herein for offsetting a detector). For example, system 10 may have two, three, or more detectors each positioned offset relative to source 14. Additionally or alternatively, system 10 may include at least one detector 16 arranged coaxially with source 16 (e.g., in a common vertical plane) and one or more detectors (e.g., two, three, or more detectors) arranged offset to the source.

Source 14 may include a radiation collimator through which radiation is emitted. Additionally or alternatively, detector 16 may include a detector collimator through which radiation is received by the detector. The use of a radiation collimator and/or detector collimator can help focus radiation emitted and/or detected within system 10.

As briefly discussed above, controller 20 can process information generated by and received from detector 16 (or multiple detectors, in the case of a detector array) concerning the amount of radiation transmitting through separation vessel 12. Controller 20 may be implemented using one or more controllers, which may be physical located onsite with separation vessel 12 and/or communicatively coupled via a network to a remote location, such as a remote server, cloud-computing environment, or other physically remote computing device.

Controller 20 may convert the radiation measured by detector 16 into a density. The intensity of radiation decreases as it passes through an absorbing material (e.g., the structure and/or fluid inside of separation vessel 12). The decrease is dependent on the density and thickness of the absorbing material according to the following formula:

$$I = I_o e^{\rho \mu x} \qquad \text{Equation:}$$

In the Equation above, $I_o$ is the intensity of the initial radiation, I is the intensity after passing through the absorbing material, $\rho$ is the density of the absorbing material, x is the thickness of the absorbing material, and $\mu$ is an absorption coefficient. Accordingly, controller 20 can convert the measured radiation into density. In some examples, controller 20 is connected to a printer and/or display to provide a visual output of density information generated during a scan (e.g., a density map).

A user may determine a condition inside of separation vessel 12 (e.g., at least one of a fouling condition and a mechanical defect inside of the separation vessel) based on the radiation information measured by detector 16 and processed by controller 20. Additionally or alternatively, controller 20 may algorithmically make such a determination, e.g., by comparing radiation and/or density information made during a scan to one or more thresholds and/or baseline information to determine a condition inside of the separation vessel.

While a user may make a single scan of separation vessel 12, more typically, a user may move source 14 and/or detector 16 to a plurality of different locations (e.g., up and/or down the length of the separation vessel) to scan along the length of the vessel. For example, the user may scan a subset of separation vessel 12 (e.g., at least a quarter of the length of the vessel, at least half the length of the vessel) to generate a more comprehensive picture of the internal operation of the vessel. Source 14 and detector 16 may each be suspended from cables, wires or the like that are routed through a pulley system, which, in turn, allows the source and detector to be raised and/or lowered along the sides of separation vessel 12. For example, beginning at the top of the separation vessel 12, source 14 and detector 16 may be simultaneously or sequentially lowered in successive increments. As source 14 and detector 16 are lowered, the intensity of the radiation can be measured.

For instance, source 14 and detector 16 may be moved in discrete increments and radiation readings made at each discrete measurement location. Each location to which source 14 and/or detector 16 are moved can define a measurement location pair (e.g., a vertical elevation pair), with the measurement pair being defined by the location of the source and the detector, respectively, at a measurement location. A radiation measurement reading may be made at each measurement location (and/or made continuously).

In some examples, source 14 and detector 16 are moved in concert (e.g., simultaneously) to maintain the same vertical offset between the source and the detector at each measurement location. For example, source 14 and detector 16 may be moved the same vertical extent (e.g., either at the same time or at different times) up and/or down the length of separation vessel 12 between adjacent measurement locations. As a result, the vertical distance 40 between source 14 and detector 16 may be substantially the same (e.g., ±10%, ±5%) at each measurement location (and angle 30 may be the same if separation vessel 12 has a same diameter at each measurement location). Accordingly, the length of radiation path 18 between source 14 and detector 16 may be substantially the same at each measurement location (where the cross-sectional thickness of vessel 12 does not change).

In other examples, source 14 and detector 16 may move different vertical distances relative to each other when moving between measurement locations. For example, one of source 14 and detector 16 may remain stationary while the other of the source and the detector moves vertically. As another example, one of source 14 and detector 16 may move a greater vertical distance than the other of the source of the detector when moving between adjacent measurement locations. As a result, the vertical distance 40 between the source and the detector may change in these applications (e.g., to scan over a larger vertical slice over at least one portion of the separation vessel than at least one other portion of the separation vessel).

Independent of whether source 14 and detector 16 each move the same vertical distance or move different vertical distances between adjacent measurement locations (e.g., elevation pairs), in some examples, the source and detector may each move at least 10 mm between measurement locations, such as at least 25 mm, at least 50 mm, or at least 100 mm. For example, source 14 and detector 16 may each move between 25 mm and 200 mm between adjacent measurement locations, between 10 mm and 100 mm, or between 15 mm and 75 mm.

Figure 3:
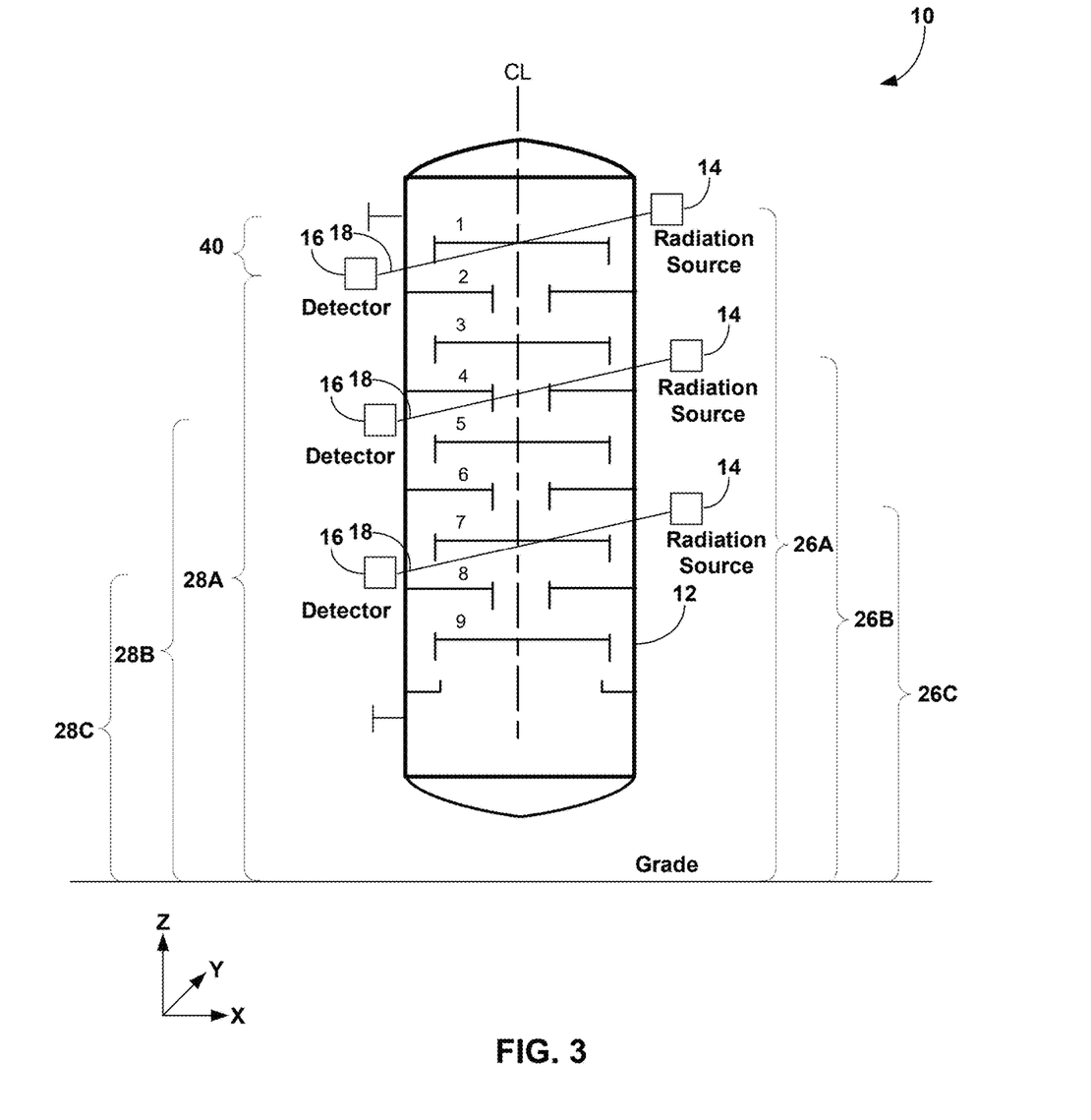
FIG. 3 is an illustration of the system of FIG. 1 depicting multiple different example elevation pairs to which a radiation source and a detector may be moved during a scanning procedure.

FIG. 3 is an illustration of system 10 depicting multiple different example elevation pairs to which source 14 and detector 16 may be moved during a scanning procedure. In this example, source 14 and detector 16 are each moved the same vertical distance between adjacent measurement locations. For example, after making a measurement at first and second elevation pairs 26A, 28A, source 14 may be moved to a third vertical elevation 26B and detector may be moved to a fourth vertical elevation 28B. Another measurement can be made at this elevation pair, and the source and detector then moved to yet another set of elevation pairs, 26C, 28C. In this way, source 14 and detector 16 can be moved to different elevation pairs and a gamma transmission readings taken at each elevation location. While FIG. 3 illustrates source 14 and detector 16 being positioned at three different elevation pairs, it should be appreciated that this is only for purposed for illustration, and the source and detector may be moved to fewer or more elevation pairs and/or different distances than illustrated.

Independent of whether source 14 and detector 16 move, or the distance one or both move during a scanning operation, the source and detector can be positioned on opposed sides of separation vessel 12. In some examples, source 14 and detector 16 are positioned on opposite sides of separation vessel 12 (e.g., with the entire width or diameter of the vessel between the source and detector). In other examples, source 14 and detector 16 may be offset from the centerline ("CL") of the separation vessel to define a scan chord that is offset from the diameter (CL) of the vessel, e.g., with the scan chord defining a chord length having endpoints lying on the circumference of the vessel wall but being offset from the CL. Source 14 and/or detector 16 may be advanced vertically upwardly and/or downwardly along separation vessel 12 to make multiple measurements along the same scan chord line.

Although the foregoing systems and techniques have been described in conjunction with a vertically arranged column, the concept of off-axis scanning described herein may also be applied to a horizontally arranged separation vessels. For example, while the foregoing systems and techniques have been described using a radiation source and detector that are vertically offset from each other, the systems and techniques may be used to horizontally offset a source and detector to provide an off-axis scan in a horizontal plane. For example, in applications where a separator drum having vertically arranged trays is scanned, source 14 and detector 16 may be positioned in a same vertical plane and horizontally offset from each other (e.g., in the X- and/or Y-axis) to provide an angled scan through the vertically arranged tray. Accordingly, embodiments of the present disclosure can be implemented by positioning a source and a detector offset in any two or more of the X-, Y-, and Z-planes from each other (e.g., all three planes) to make a scan through a vessel.

Figures 4A, 4B:
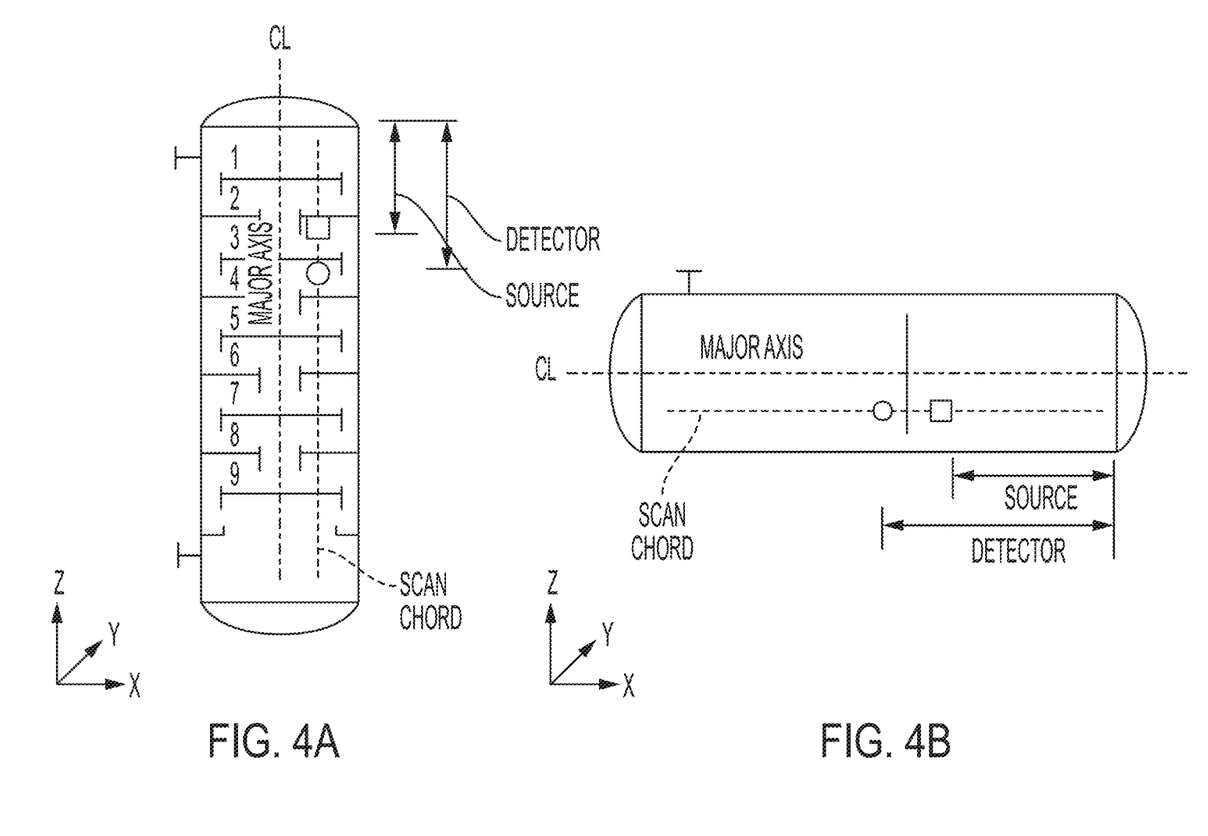
FIGS. 4A and 4B are comparative illustrations showing an example configuration of a radiation source and detector scanning across a tray in a vertical-oriented and horizontally-oriented separation vessel, respectively.

FIGS. 4A and 4B are comparative illustrations showing an example configuration of a radiation source and detector scanning across a tray in a vertical-oriented and horizontally-oriented separation vessel, respectively. When the systems and techniques of the disclosure are implemented to perform an off-axis scan of a horizontally arranged separation vessel, any of the foregoing techniques, hardware arrangements, and dimensions discussed above in connection with vertically-arranged vessels can be used for the horizontally arranged separation vessel (e.g., a horizontally arranged separation vessel having a series of vertically extending separation plates arrayed across the length of the vessel). In these applications, reference to vertical dimensions, elevations, angles, or the like may be implemented as horizontal dimensions, offsets, angles, or the like.

For example, to perform a non-invasive inspection of a horizontally-oriented separation vessel such as that illustrated in FIG. 4B, the source and detector can be positioned on different sides of the separation vessel with at least a portion of the vessel interposed between the source and detector. The source and detector can be positioned offset from each along the length of the horizontally-oriented separation vessel (e.g., in the X-direction indicated on FIG. 4B) to define a non-zero degree angle between the source and detector transecting through the separation vessel. In these examples, the source and detector may be at the same or may be at different vertical elevations relative to each other.

By positioning the source and detector at different first and second horizontal locations along the length of the separation vessel, the radiation path defined between the source and detector can transect the separation vessel at an angle, e.g., passing through both an extent of length and width of the vessel between the source and detector. This can provide information concerning the internal structure and/or operation of the separation vessel over a larger slice of the vessel as compared to taking a scan when the source and detector positioned in the same X-Y plane.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable storage medium may cause a programmable processor, or other processor, to perform the method, e.g., when the instructions are executed. Non-transitory computer readable storage media may include volatile and/or non-volatile memory forms including, e.g., random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Example implementations according to the present disclosure include the following:

Example 1: a method of inspecting a separation vessel using gamma scanning that includes emitting gamma radiation by a gamma radiation source through a separation vessel toward a detector and detecting, by the detector, radiation emitted by the gamma radiation source and passing through the separation vessel. The gamma radiation source is positioned at a first vertical elevation along the separation vessel and the detector is positioned at a second vertical elevation along the separation vessel different than the first vertical elevation, thereby defining a radiation path between the gamma radiation source and the detector transecting the separation vessel at a non-zero degree angle with respect to a horizontal plane.

Example 2: the method of Example 1 wherein the non-zero degree angle ranges from 15 degrees to 75 degrees with respect to the horizontal plane.

Example 3: the method of Example 1 wherein the first vertical elevation is higher than the second vertical elevation.

Example 4: the method of Example 1, wherein the radiation path transects at least 25 mm of vertical elevation of the separation vessel between the gamma radiation source and the detector.

Example 5: the method of Example 1, wherein the separation vessel comprises a plurality of trays, and at least one of the plurality of trays defines a thickness less than the vertical elevation of the separation vessel transected by the radiation path between the gamma radiation source and the detector.

Example 6: the method of Example 1, wherein separation vessel comprises a plurality of trays with a spacing defined between adjacent trays of the plurality of trays, and a distance between the first elevation at which the gamma radiation source is positioned and the second elevation at which the detector is positioned is less than the spacing between adjacent trays.

Example 7: the method of Example 1, wherein the separation vessel comprises a tray having a horizontal tray surface providing an active area of the tray, and the radiation path transects the active area of the tray.

Example 8: the method of Example 1, further including moving the gamma radiation source to a third vertical elevation, moving the detector to a fourth vertical elevation, with the gamma radiation source positioned at the third vertical elevation, emitting gamma radiation by the gamma radiation source through the separation vessel toward the detector, and with the detector positioned at the fourth vertical elevation, detecting radiation emitted by the gamma radiation source and passing through the separation vessel.

Example 9: the method of Example 8, wherein a vertical distance between the first elevation and the second elevation and a vertical distance between the third elevation and the fourth elevation are substantially the same.

Example 10: the method of Example 8, wherein the separation vessel has a circular cross-sectional shape, and a length of the radiation path between the gamma radiation source and the detector is substantially the same when the gamma radiation source is positioned at the first vertical elevation and the detector is positioned at the second vertical elevation as compared to when the gamma radiation source is positioned at the third vertical elevation and the detector is positioned at the fourth vertical elevation.

Example 11: the method of Example 8, wherein moving the gamma radiation source from the first vertical elevation to the third vertical elevation and moving the detector from the second vertical elevation to the fourth vertical elevation comprises moving each of the gamma radiation source and the detector at least 50 mm in a vertical direction.

Example 12: the method of Example 1, wherein the gamma radiation source comprises a plurality of gamma radiation sources, at least some of which are vertically arrayed with respect to each other, and the detector comprises a plurality of detectors, at least some of which are vertically arrayed with respect to each other.

Example 13: the method of Example 1, wherein emitting gamma radiation by the gamma radiation source comprises emitting gamma radiation through a radiation collimator, and detecting radiation passing through the separation vessel comprises receiving, by the detector, radiation through a detector collimator.

Example 14: the method of Example 1, wherein emitting gamma radiation by the gamma radiation source through the separation vessel and detecting, by the detector, radiation emitted by the gamma radiation source and passing through the separation vessel comprises emitting gamma radiation and detecting radiation during operation of the separation vessel in which fluid is fractionated.

Example 15: the method of Example 13, further comprising determining, based on the radiation passing through the separation vessel and detected by the detector, at least one of a fouling condition and a mechanical defect inside of the separation vessel.

Example 16: the method of Example 1, wherein the horizontal plane is defined by a ground on which the separation vessel is supported.

Example 17: the method of Example 1, wherein the separation vessel is a distillation column in which vapor rises and liquid falls.

Example 18: a method of scanning a separation vessel that includes positioning a gamma radiation source and a detector on opposed sides of a separation vessel and positioning the gamma radiation source and the detector at a plurality of different vertical elevation pairs along a length of the separation vessel. At each of the plurality of different vertical elevation pairs the gamma radiation source is at a different vertical elevation than the detector such that a radiation path between the gamma radiation source and the detector transects the separation vessel at a non-zero degree angle. The method includes, at each of the different vertical elevation pairs, emitting gamma radiation by the gamma radiation source through the separation vessel and detecting, by the detector, radiation emitted by the gamma radiation source and passing through the separation vessel.

Example 19: the method of Example 18, wherein positioning the gamma radiation source and the detector at the plurality of different vertical elevation pairs along the length of the separation vessel comprises moving the gamma radiation source and the detector at least 25 mm between each of the plurality of different vertical elevation pairs.

Example 20: the method of Example 19, wherein the separation vessel comprises a plurality of trays, and at least one of the plurality of trays defines a thickness less 25 mm.

Example 21: the method of Example 19, wherein, at each of the different vertical elevation pairs, the radiation path transects at least 25 mm of vertical elevation of the separation vessel between the gamma radiation source and the detector.

Example 22: the method of Example 18, wherein a difference between a vertical elevation of the gamma radiation source and the detector is substantially the same at each of the plurality of different vertical elevation pairs.

Example 23: the method of Example 18, wherein the non-zero degree angle ranges from 15 degrees to 75 degrees with respect to a horizontal plane.

Example 24: the method of Example 18, wherein the separation vessel has a circular cross-sectional shape, and a length of the radiation path between the gamma radiation source and the detector is substantially the same at each of the plurality of different vertical elevation pairs.

Example 25: the method of Example 18, wherein the gamma radiation source comprises a plurality of gamma radiation sources, at least some of which are vertically arrayed with respect to each other, and the detector comprises a plurality of detectors, at least some of which are vertically arrayed with respect to each other.

Example 26: the method of Example 18, wherein emitting gamma radiation by the gamma radiation source comprises emitting gamma radiation through a radiation collimator, and detecting radiation passing through the separation vessel comprises receiving, by the detector, radiation through a detector collimator.

Example 27: a separation vessel gamma radiation scanning system that includes a separation vessel, a gamma radiation source, and a detector. In the system, the gamma radiation source and the detector are positioned on opposed sides of the separation vessel with the gamma radiation source positioned at a different vertical elevation than the detector such that a radiation path between the gamma radiation source and the detector transects the separation vessel at a non-zero degree angle with respect to a horizontal plane.

Example 28: the system of Example 27, further comprising a controller communicatively coupled to the gamma radiation source and the detector, wherein the controller is configured to control the gamma radiation source to emit gamma radiation into the separation vessel and receive, from the detector, information corresponding to radiation detected by the detector.

Example 29: the system of Example 28, wherein the controller is further configured to determine, based on the received information corresponding to radiation detected by the detector, at least one of a fouling condition and a mechanical defect inside of the separation vessel.

Example 30: the system of Example 27, wherein the separation vessel comprises a plurality of trays, and at least one of the plurality of trays defines a thickness less than a vertical elevation of the separation vessel transected by the radiation path between the gamma radiation source and the detector.

Example 31: the system of Example 27, wherein separation vessel comprises a plurality of trays with a spacing defined between adjacent trays of the plurality of trays, and a distance between the gamma radiation source and the detector is less than the spacing between adjacent trays.

Example 32: the system of Example 27, wherein the separation vessel comprises a tray having a horizontal tray surface providing an active area of the tray, and the radiation path transects the active area of the tray.

Example 33: the system of Example 27, wherein the gamma radiation source comprises a plurality of gamma radiation sources, at least some of which are vertically arrayed with respect to each other, and the detector comprises a plurality of detectors, at least some of which are vertically arrayed with respect to each other.

Example 34: the system of Example 27, further comprising a radiation collimator through which gamma radiation emitted by the gamma radiation source passes prior to entering the separation vessel, and a detection collimator through which radiation passing through the separation vessel travels before being received by the detector.

Example 35: the system of Example 27, wherein the separation vessel is a distillation column in which vapor rises and liquid falls.

The following examples may provide additional details about gamma scanning systems and techniques according to the disclosure.

Example

Two different gamma scans were performed on a distillation tower to compare the performance of off-axis scanning according to the present disclosure to traditional horizontal gamma scanning. The scanning was conducted on a distillation column having standard 2-pass distillation trays. The active area panels of the trays were sieve, valve, and bubble cap decks (several types of panels were co-mingled on the decks). The downcomers were sloped, traditional full tray spacing downcomers with appropriate clearance (not truncated downcomers). Downcomer construction was not deemed important for the experimental example since scanning focused on the active areas of the trays.

To conduct the traditional scan, a source and detector were positioned at the same elevation on opposite sides of the distillation column. Scan measurements were then made a different locations along the length of the distillation column, with the source and detector being horizontally aligned for each scan measurement. A base scan was made with all the trays and panels present in the distillation column. Subsequently, a manway panel was removed from one of the trays to simulate a blown-out panel and a second scan was made of the column. Afterwards, several tray panels were removed on each tray to simulate major damage and a third scan was made of the column.

To conduct the off-axis scan, a source and detector were positioned at different vertical elevations from each other on opposite sides of the distillation column. For example, as shown in FIG. 2, the source (S) was initially placed at position 1 above the tray deck and the detector (R) was placed at position 1 below the tray deck. Both the source and detector were dropped simultaneously at the same rate of descent. Starting at position 1, the location of the source/detector and scan angle was such that the point of absorption reading corresponded to the tray panel closest to the detector. Subsequent readings at position 2, 3, and 4 on FIG. 2 represent different positional readings across the tray deck, thereby providing absorption readings corresponding to other tray panels. Radiation absorption differences between the parallel angle slant scans were expected to be minimal so that the relative absorption comparison would yield information on tray integrity.

Figure 5A:
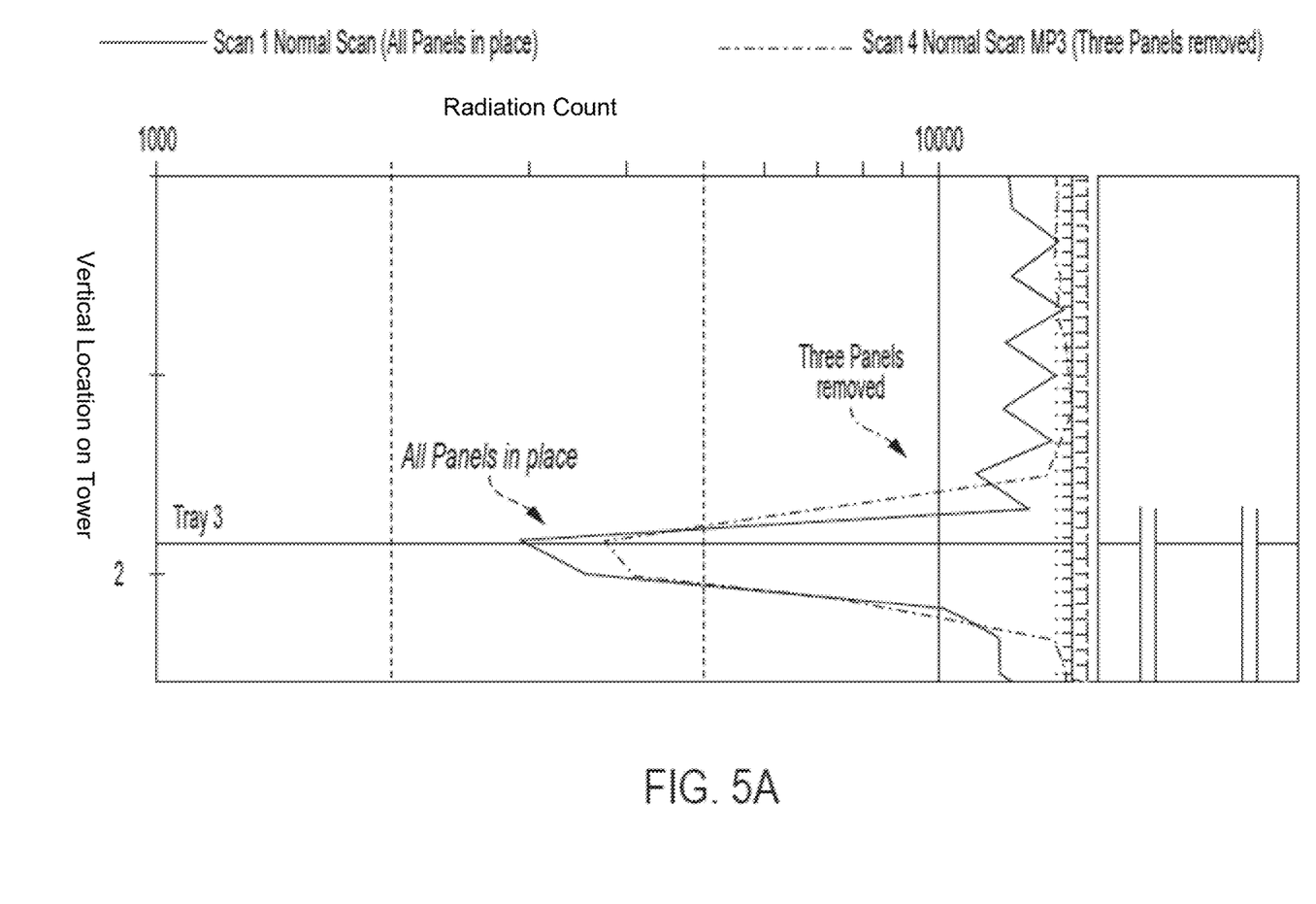
FIGS. 5A and 5B illustrate traditional scan results and off-axis scan results, respectively, for a scanning experiment.
Figure 5B:
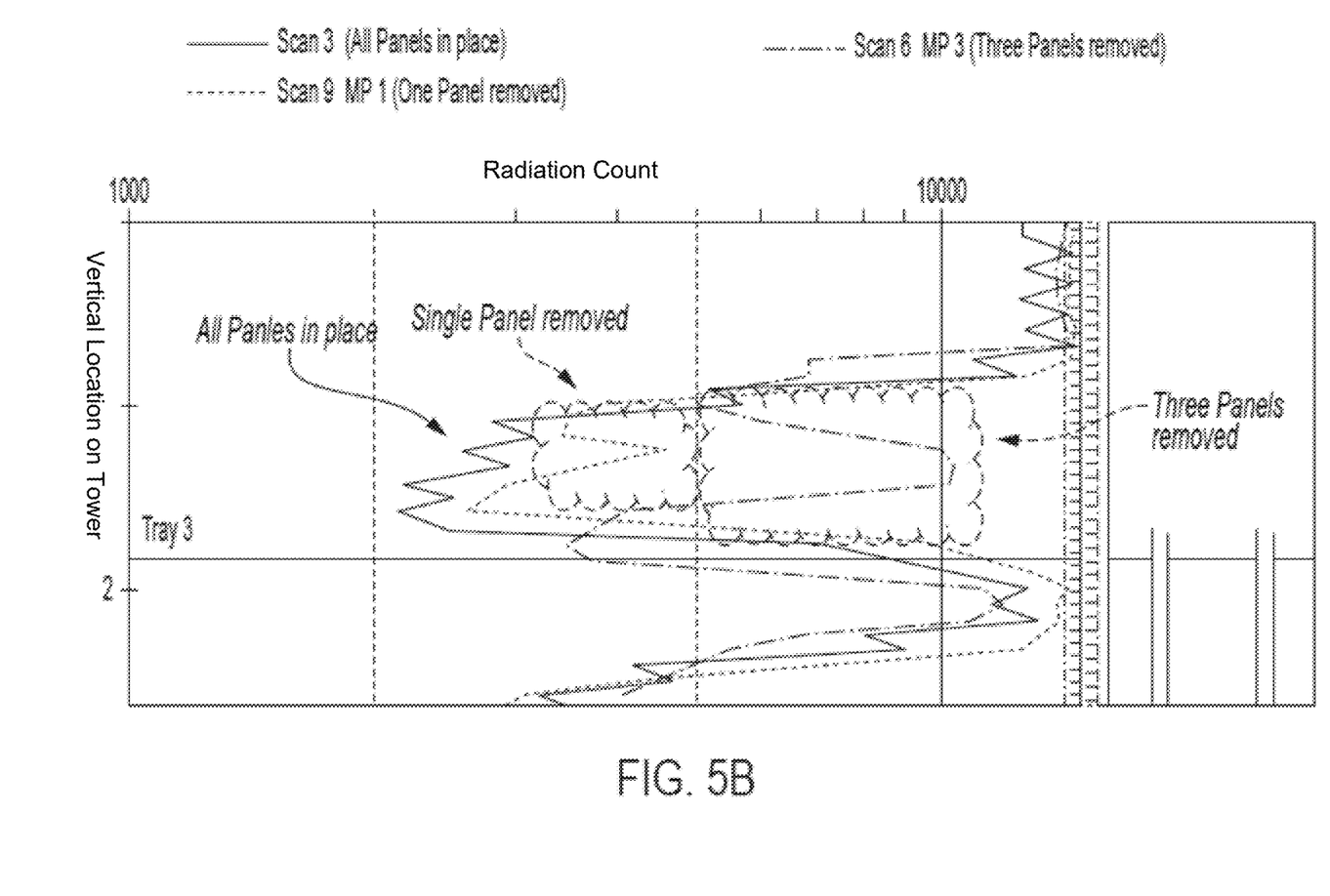

FIGS. 5A and 5B illustrate traditional scan results and off-axis scan results, respectively, for the experiment. The Y-axis in the figures represents vertical location on the tower; the X-axis in the figures represents radiation count and, hence, density. The figures illustrate the performance difference between the horizontal scan and the off-axis scan. In the horizontal scan shown in FIG. 5A, one can see only absorption at the tray elevation, but the other elevations do not show absorption (as it is a non-functioning column). In the off-axis scan shown in FIG. 5B, when all the tray parts are in place (e.g., during the base scan) and was a consistent absorption as the point of intersection traveling across the tray deck.

Comparing the base scan with a perturbed tray (the other two scans), one can see that the perturbed tray (in which a single panel and/or multiple panels have been removed) results in a very identifiable and distinguishable absorption profile for each case. As the intersection point moves from a tray deck to an open area (where the manway was before being removed), a differential amount of absorption is identified indicating missing panel(s). Thus, the off-axis scan can identify structural defects not identified in the horizontal scan. Indeed, in the base scan of FIG. 5A, there are limited differences in gamma readings between the scan performed on the intact column and the scan performed on the column with missing panels, resulting in the missing panels not being detected during the horizontal scan.

The invention claimed is:

1. A method of scanning a separation vessel, the method comprising:
positioning a gamma radiation source and a detector on opposed sides of a separation vessel;
positioning the gamma radiation source and the detector at a plurality of different vertical elevation pairs along a length of the separation vessel, wherein at each of the plurality of different vertical elevation pairs the gamma radiation source is at a different vertical elevation than the detector such that a radiation path between the gamma radiation source and the detector transects the separation vessel at a non-zero degree angle, and at each of the plurality of different vertical elevation pairs a vertical distance between the gamma radiation source and the detector is substantially a same distance; and
at each of the different vertical elevation pairs, emitting gamma radiation by the gamma radiation source through the separation vessel and detecting, by the detector, radiation emitted by the gamma radiation source and passing through the separation vessel, and
wherein the separation vessel comprises a plurality of trays with a spacing defined between adjacent trays of the plurality of trays, the vertical distance between the gamma radiation source and the detector at each of the plurality of different vertical elevation pairs is less than the spacing between adjacent trays, and greater than a thickness of at least one of the plurality of trays.

2. The method of claim 1, wherein positioning the gamma radiation source and the detector at the plurality of different vertical elevation pairs along the length of the separation vessel comprises moving the gamma radiation source and the detector at least 25 mm between each of the plurality of different vertical elevation pairs.

3. The method of claim 2, wherein, at each of the different vertical elevation pairs, the radiation path transects at least 25 mm of vertical elevation of the separation vessel between the gamma radiation source and the detector.

4. The method of claim 1, wherein the non-zero degree angle ranges from 2 degrees to 75 degrees with respect to a horizontal plane.

5. The method of claim 1, wherein the separation vessel has a substantially circular cross-sectional shape, and a length of the radiation path between the gamma radiation source and the detector is substantially the same at each of the plurality of different vertical elevation pairs.

6. The method of claim 1, further comprising determining, by a controller, a condition inside of the separation vessel based on radiation information measured by the detector.

7. The method of claim 6, wherein the condition comprises a missing and/or damaged one of the plurality of trays.

8. The method of claim 6, wherein the condition comprises plugging of one of the plurality of trays.

9. The method of claim 1, wherein the thickness of at least one of the plurality of trays is 15 mm or less.

10. The method of claim 1, further comprising positioning a second detector at a same elevation as the gamma radiation source and detecting, by the second detector, radiation emitted by the gamma radiation source and passing through the separation vessel.

11. The method of claim 1, wherein emitting gamma radiation by the gamma radiation source through the separation vessel and detecting, by the detector, radiation emitted by the gamma radiation source and passing through the separation vessel comprises emitting gamma radiation and detecting radiation absorption during operation of the separation vessel in which fluid is fractionated.

12. The method of claim 1, wherein positioning the gamma radiation source and the detector at the plurality of different vertical elevation pairs comprises performing a single scan at each of the plurality of different vertical elevation pairs before moving to a different one of the plurality of different vertical elevation pairs.

13. The method of claim 1, further comprising determining, by a controller, density information inside of the separation vessel based on the equation:

$$I = I_o e^{\rho \mu x}$$

wherein $I_o$ is an intensity of an initial radiation, I is an intensity after passing through an absorbing material, $\rho$ is a density of the absorbing material, x is a thickness of the absorbing material, and $\mu$ is an absorption coefficient.

* * * * *